United States Patent [19]

Chang et al.

[11] Patent Number: 4,727,550

[45] Date of Patent: Feb. 23, 1988

[54] RADIATION SOURCE

[76] Inventors: David B. Chang, 14212 Livingston St., Tustin, Calif. 92680; James C. McDaniel, 626 N. Clementine, Anaheim, Calif. 92805; Norton L. Moise, 1674 Palisades Dr., Pacific Palisades, Calif. 90272; Winfield W. Salisbury, 10925 Wedgewood Dr., Sun City, Ariz. 85351; I-Fu Shih, 4656 Fir Ave., Seal Beach, Calif. 90740

[21] Appl. No.: 777,893

[22] Filed: Sep. 19, 1985

[51] Int. Cl.[4] .............................................. H01S 3/00
[52] U.S. Cl. ........................................ 372/2; 372/20; 372/9; 315/4; 315/5
[58] Field of Search ..................... 372/2, 20, 9; 315/4, 315/5

[56] References Cited

U.S. PATENT DOCUMENTS

| | | |
|---|---|---|
| 2,634,372 | 4/1953 | Salisbury . |
| 4,545,056 | 10/1955 | Wortman et al. .................. 378/2 |
| 4,571,726 | 2/1986 | Wortman et al. .................. 372/2 |
| 4,590,596 | 5/1986 | Wortman et al. .................. 372/2 |

OTHER PUBLICATIONS

Wortman et al., "Millimeter-Wave Orotron Oscillation-Part II: Experiment", IEEE JQE Vol. QE-17, No. 8, Aug. 1981.
Mizuno et al., "Interaction between Coherent Light Waves and Free Electrons with reflecting Grating", Native Vol. 253, Jan. 1975.
W. W. Salisbury: Generation of Light from Free Electrons, Journal of the Optical Society of America, vol. 60, No. 10, Oct. 1970, New York; pp. 1279-1284.
D. E. Wortman et al.: Improved Orotron Performance in the 50-to 75-GHZ Frequency Region; IEEE Transactions on Electron Devices, vol. Ed-29, No. 10, Oct. 1982, New York, pp. 1639-1640.
H. Bilokon et al.: Coherent Bremsstrahlung in Crystals as a Tool for Producing High Energy Photon Beams to be used in Photoproduction Experiments at Cern SPS., Nuclear Instruments & Methods, vol. 204, No. 2/3, Jan. 1983, Amsterdam (NL), pp. 299-310.
A. E. Kaplan et al.: Extreme-Ultraviolet and X-Ray Emission and Amplification by Nonrelativistic Electron Beams Traversing a Superlattice, Applied Physics Letters, vol. 44, No. 7, Apr. 1984, New York, pp. 661-663.
J. M. Wachtel: Free Electron Lasers Using Smith-Purcell Effect, Journal of Applied Physics, vol. 50, No. 1, Jan. 1979, New York, pp. 49-56.
M. A. Piestrup et al.: THR Prospects of an X-Ray Free Electron Laser using Simulated resonance Transition Radiation, IEEE Journal of Quantum electronics, vol. QE-19, No. 3, Mar. 1983, New York, pp. 357-364.

*Primary Examiner*—Leon Scott, Jr.

[57] ABSTRACT

An improved radiation source is disclosed, exploiting the spontaneous radiation generated from the interaction of an electron beam and a conductive grating. Conditions are defined for generating coherent or noncoherent radiation, and for extending the tunability of the radiation source from millimeter, IR, visible and UV wavelengths to x-ray wavelengths, and for generating multiple wavelengths simultaneously. Conditions are disclosed for enhancing the intensity of the spontaneous radiation, anf for modulating the radiation.

37 Claims, 18 Drawing Figures

RADIATION SOURCE

BACKGROUND OF THE INVENTION

The present invention relates to radiation sources employing an electron beam reflecting from a conductive grating.

Radiation from electrons interacting with a diffraction grating has been studied both theoretically and experimentally since the early work of W. W. Salisbury described in U.S. Pat. No. 2,634,372 and *J. Opt. Soc. Am.*, Vol. 60, page 1279 et seq. (1970), and the work of S. J. Smith and E. M. Purcell as described in *Phys. Rev.*, Vol. 92 page 1069 et seq. (1953). As described in these references, an electron beam interacting with the surface of a metallic grating has been shown to generate electromagnetic radiation. This radiation source is easily tunable, with the wavelength $\lambda$ depending on the grating period a, electron speed $v_o$ and the angle $\theta$ between the electron velocity and observation direction as shown in Equation 1, where c is the velocity of light.

$$\lambda = a\left(\frac{c}{v_o} - \cos(\theta)\right) \quad (1)$$

Past theoretical treatments of the radiation from an electron beam interacting with the surface of a metallic grating are understood to have assumed that the electrons do not collide with the grating. With this assumption, both incoherent and coherent radiation have been discussed.

The incoherent radiation has been discussed in terms of dipole radiation from oscillating image changes (S. J. Smith and E. M. Purcell, *Physics Review*, Vol. 92, page 1069 (1953)), grating scattering of the evanescent waves tied to the electrons (E. Labor, *Physics Review*, Vol. A7, page 435 (1973); G. Toraldo di Francia, *Nuovo Cimento*, Vol. 16, page 61 (1960)), and rigorous Green's function formulations of the electromagnetic fields generated in the half-space grounded by the grating (C. W. Barnes and K. G. Dedrick, *J. Appl. Phys.*, 37, 411 (1966); P. M. Van den Berg and T. H. Tan, *J. Opt. Soc. Am.*, 64, 325 (1974)).

The generation of coherent radiation has been discussed in connection with the situation when the electron beam and grating are placed within a resonant cavity. The resulting device has been called the oratron or ledatron. (F. S. Rusin and G. D. Bogomolov, *JETP Lett.*, 4, 160 (1966); K. Mizuno, S. Ono. and Y. Shibata, *IEEE Trans. Electron Devices*, ED-20,749 (1973)). In that case, the coherent radiation produced has been treated by calculating the power transferred from an electron beam to a cavity mode which is perturbed by the periodic grating. R. P. Leavitt, D. E. Wortman, and C. A. Morrison, *Appl. Phys. Lett.*, 35, 363 (1979); R. P. Leavitt and D. E. Wortman, *J. Appl. Phys.*, 54, 2219 (1983).

In none of the foregoing analyses are the electrons assumed to collide with the grating. There is, however, some experimental work indicating that electron collisions with the grating should make an appreciable difference. The early experiments of W. Salisbury with low divergence beams scattering off the grating, discussed in the paper "Generation of Light from Free Electrons", Winfield W. Salisbury, *Journal of the Optical Society of America*, Winfield W. Salisbury, Vol. 60, No. 10, October 1970, pp. 1279-1284, disclosed the following significant differences from the Smith-Purcell-type experiments in which no electron collisions with the grating occurred.

1. The radiation intensity was much larger with very bright colors appearing even when overhead illumination was present;
2. electrons which were 1 mm from the grating contributed as much as electrons within a grating spacing of the grating; and
3. the radiation intensity was largest when the numbers of scattered and unscattered electrons were comparable.

The second finding above is in direct contradiction to theoretical calculations which assume that no collisions with the grating occur. These calculations indicate that electrons which are farther away from the grating than one grating spacing should produce negligible radiation.

Insofar as is known to applications, the above-referenced research efforts have not resulted in explanations of the underlying radiation phenomena, which has, in turn, limited the usefulness of the phenomena.

It is, therefore, an object of the present invention to provide radiation source resulting from an understanding of the emission of radiation from the reflection of electrons from a grating.

It is another object of the present invention to provide a radiation source which is easily tunable over a broad band of wavelengths and which can provide either coherent or noncoherent radiation.

It is another object to provide a radiation source which may be easily modulated both in frequency and in amplitude.

SUMMARY OF THE INVENTION

An improved radiation source is disclosed. The radiation source comprises a conductive grating having a periodic grating spacing a, means for providing a periodic space-charge structure of electrons above the grating, and an electron beam generator adapted to direct a beam of electrons through the periodic space-charge structure. Radiation is emitted, resulting from the accelerated surface currents induced in the grating by the electron beam and space-charge structure. The radiation passes through the periodic space-charge structure, a slow wave radiation structure, wherein the spatial sidebands move more slowly than the fundamental wavelength radiation. This allows resonant transfer of energy between the electrons and the slowly moving component of the radiation, thus, amplifying the radiation from the induced grating surface currents.

In accordance with the invention, coherent radiation from the device will dominate the incoherent radiation when the spontaneous radiation from the induced surface currents experience an amplification gain greater than unity on moving through the periodic space-charge structure above the grating.

Another aspect of the invention is the enhancement of the coherent radiation using collective effects. This occurs when the plasma frequency of the electron beam is comparable to the radiation frequency. Equation 1 shows that the latter is of the order of $v_o/a$, where $v_o$ is the electron velocity and a is the grating spacing.

In an alternative embodiment, the periodic space-charge structure is created by means other than by scattering an electron beam off a diffraction grating, i.e., by use of a Periodic Pierce electrode structure to create sheets of charged particles transverse to the beam, as well as to create induced surface currents.

In another alternate embodiment, the radiation source is disposed in a cavity comprising a reflecting surface constructed of a superconducting material, which is operated at a superconducting temperature. This results in the reflecting surface becoming almost loss-free, thus permitting the resonant fields to increase so that more energy can be transferred between the beam electrons and the field. The cavity may alternatively be constructed so that the reflecting faces are disposed to capture the radiation at a predetermined angle to maximize the radiation.

In another embodiment, the radiation source is adapted to enhance radiation in a particular direction, by appropriate selection of the grating blaze angle and depth.

Radiation at different wavelengths and with correlated phases can be radiated simultaneously by employing multiple beams of electrons of different energies.

The radiation emitted by the radiation source in accordance with the invention can be both frequency-modulated and amplitude-modulated, the former by varying the electron acceleration voltage and the latter by deflecting the beam transversely. Transverse deflection can be achieved by applying a small voltage to the grating.

The invention may be extended to x-ray wavelengths, by using crystals or superlattices to either reflect or transmit charged particles to create periodic sheets of space charge. Broadband radiation may be obtained by directing the beam more directly at the grating, so that a significant number of the high energy electrons are absorbed into the grating, resulting in generation of significant Bremsstrahling radiation.

BRIEF DESCRIPTION OF THE DRAWINGS

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENTS

The present invention comprises a novel radiation source. The following description is presented to enable any person skilled in the art to make and use the invention. Various modifications to the preferred embodiments will be readily apparent to those skilled in the art, and the generic principles defined herein may be applied to other embodiments and applications. Thus, the present invention is not intended to be limited to the embodiments shown, but is to be accorded the widest scope consistent with the principles and novel features disclosed herein.

Figure 1:
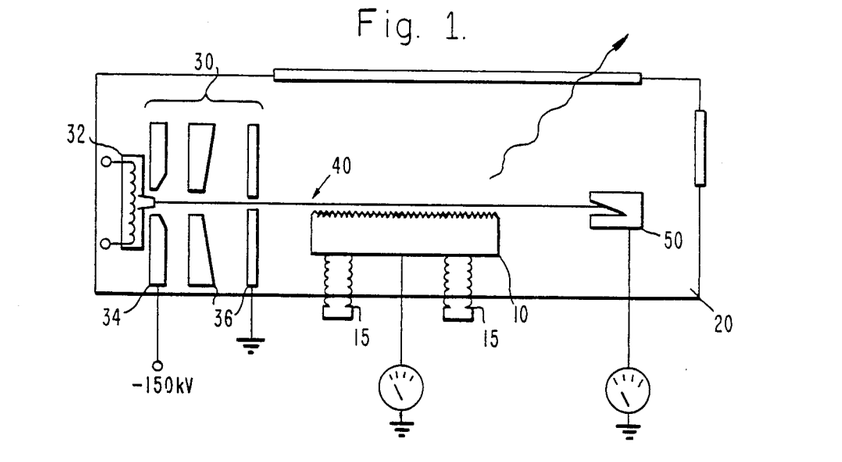
FIG. 1 is a general schematic diagram of a radiation source which employs the interaction of an electron beam and a grating.

The invention comprises a radiation source employing the interaction of an electron beam with a conductive grating. FIG. 1 discloses a simplified schematic diagram of the system. The elements are enclosed in chamber 20, which is evacuated preferably to a pressure of about $10^{-3}$ Torr or below. The conductive grating 10 is disposed in the chamber 20, mounted on adjusting screws 15 which permit translating and tilting of the grating position from outside the vacuum chamber.

An electron beam gun 30 is disposed within chamber 20 and is adapted to generate an electronic beam 40. In the disclosed embodiment, the gun 30 is a Pierce electron gun, comprising a thermionic cathode 32 as a source of free electrons, an accelerating grid 34 and collimating plates 36 for collimating the resultant electron beam 40. The acceleration voltage is adjustable. (In experiments conducted by applicants, acceleration voltages up to 150 kV have been used and higher accelerations would be beneficial in some applications.)

The electron beam 40 is directed over the grating 10. The distance between the beam and the grating, and the beam incidence angle, can be adjusted by translating and tilting the grating from outside the vacuum chamber. An electron catcher 50 is disposed in the chamber, opposite the grating from the electron gun so as to trap the unscattered electrons after passing the grating.

Windows 60 are provided in the enclosure defining the evacuated chamber 20 for escape of the radiation 70 generated by the electron beam.

A. Spontaneous Radiation.

1. Smith-Purcell-Type Radiation When Electrons Do Not Collide With Grating.

As was discussed above, several theoretical discussions have appeared in the literature concerning the case with no electron collisions with the grating. This is the case when the electron beam 40 as shown in FIG. 1 is not allowed to graze the grating 10. These discussions range from the original idea of Smith and Purcell of dipole radiation from an oscillating image charge in the grating, though calculations of the scattering from the grating of the evanescent waves tied to the electrons, to rigorous Green's function formulations of the electromagnetic fields generated in the region bounded by the conduction grating. (S. J. Smith and E. M. Purcell, *Phys. Rev.*, 92, 1069 (1953); E. Labor, *Phys. Rev.*, A7, 435 (1973); G. Toraldo di Francia, *Nuovo Cimento*, 16, 61 (1960); C. W. Barnes and K. G. Dedrick, *J. Appl. Phys.*, 37, 411 (1966); P. M. Van Den Berg and T. H. Tan, *J. Opt. Soc. Am.*, 64, 325 (1964)).

The angular distribution of the radiation intensity predicted by the simple oscillating image charge analog is quite different from that predicted by the rigorous Green's function calculations. The former gives a characteristic dipole radiation pattern with the major lobes in the directions defined by the electron path; as the electron energy increases, the lobe in the direction of the electron's motion increase, while the backward lobe decreases, (W. W. Salisbury, U.S. Pat. No. 2,634,372 (1949); W. W. Salisbury, J. Opt. Soc. Am., 60, 1279 (1970)). On the other hand, the Green's function approach appears to give the main lobe in the backward direction. (P. M. Van den Berg, *J. Opt. Soc. Am.*, 63, 1588 (1973)). The results of the rigorous Green's function treatments are expressed in terms of perturbation expansions, and these are sufficiently complex that the underlying physical occurrences can be obscured.

One aspect of the invention is the provision of a simple model of the radiation mechanism which emphasizes the underlying physics and illustrates why the image charge and Green's function approaches lead to such different results.

An approximate expression may be obtained for the surface current density $\vec{j}(\vec{r},t)$ induced in the grating by a passing electron. In terms of this current density, the $\omega$ frequency component of the vector potential $\vec{A}_\omega$ at a large distance $R_o$ from the grating in the direction $\vec{k}/|\vec{k}|$ is given by:

$$A_\omega = \frac{e^{ikR_o}}{2\pi cR_o} \int \int dT\, dS\, e^{i(\omega t - \vec{k}\cdot\vec{r})}\vec{j}(\vec{r},t) \tag{2a}$$

where c is the speed of light, $k=\omega/c$, and dS is the differential area element on the grating surface. The energy $d\epsilon_\omega$ radiated into the element of solid angle $d\Omega$ in the form of waves with frequencies in the angular frequency interval $d\omega$ is then:

$$d\epsilon_\omega = c|\vec{k}\times\vec{A}_\omega|^2 \frac{R_o^2}{(2\pi)^2} d\Omega\, d\omega \tag{2b}$$

The surface current density $\vec{j}(\vec{r},t)$ can be approximated by modifying slightly that which would result from an electron moving parallel to a flat conductor. Thus, for an electron of charge e at a distance l above a flat conductor, the surface charge density at a radial distance P from the point immediately below the electron is:

$$\sigma_o(P,l) = \frac{el}{2\pi(P^2 + l^2)^{3/2}} \tag{3}$$

If the undulating geometry of the diffraction grating is added as a simple sinusoidal perturbation of wave number $\vec{k}_g$ and amplitude b, the surface charge density can be approximated by:

$$\sigma(P, l + be^{i\vec{k}_g\cdot\vec{r}}) \simeq \sigma_o + \frac{\partial \sigma_o}{\partial l} be^{i\vec{k}_g\cdot\vec{r}} \tag{4}$$

The corresponding perturbed surface currents will be:

$$j_x = \frac{\partial \sigma_o}{\partial l} be^{ik_g x} \frac{v_o}{c} \tag{5}$$

$$j_y = i\sigma_o k_g \frac{v_o}{c} e^{ik_g x} \tag{6}$$

where the electron is assumed to be moving in the x-direction at velocity $v_o$, $k_g$ is assumed to be oriented in this direction, and y is in the direction perpendicular to the grating.

For an observation point in the x-y plane defined by the electron velocity and the perpendicular to the grating at an angle $\theta$ above the grating, this current density gives:

$$d\epsilon_\omega = \frac{k^2 e^2 v_o^2 T}{8\pi^3 c^3} e^{2\Delta kl} g(\omega + \Delta k \cdot v_o)\{b^2(\Delta k)^2\sin^2\theta + \cos^2\theta\}d\Omega\, d\omega \tag{7}$$

where $$\Delta k = k_g - k\cos\theta \tag{8}$$

and T is the total time the electron interacts with the grating.

Figure 2:
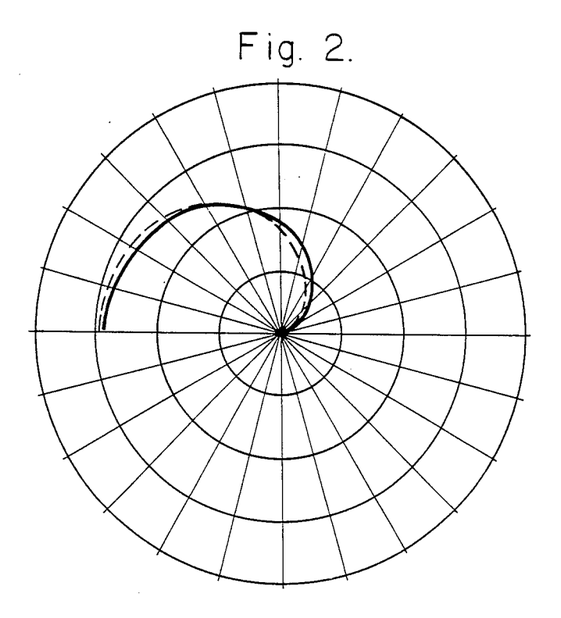
FIG. 2 is a graph which compares the angular distribution of the Smith-Purcell-type radiation density derived in accordance with the invention (solid curve) with the values obtained by known Green's function formulations (dashed curve).

FIG. 2 compares this simple expression with the numerical results obtained by the Green's function formulations. The angular distribution of intensity compares well. In FIG. 2, the solid curve represents the simple model of Equation 7 and the dashed curve depicts the results of the Green's function formulation.

2. Spontaneous Radiation from Electrons Moving Through the Salisbury Troughs Formed by Electrons Reflecting from the Grating.

Following his early experiments, Salisbury proposed that the electrons reflected from the grating formed sheets of space-charge having the same periodicity as the grating. W. W. Salisbury, U.S. Pat. No. 2,634,372 (1949); W. W. Salisbury, *J. Opt. Soc. Am.*, 60, 1279 (1970). Other electrons passing through these sheets of space-charge would then be alternately accelerated and decelerated by the electrostatic forces between then and the electrons comprising the space-charge sheets. Since the space-charge would occupy the region even far from the grating, this would permit distant electrons to radiate as well as electrons that are close to the grating. Thus, in this hypothesis, in addition to the surface currents responsible for the radiation in the Smith-Purcell-type experiment (where the electrons do not scatter from the grating), bulk currents in the space above the grating can also contribute.

Figure 3:
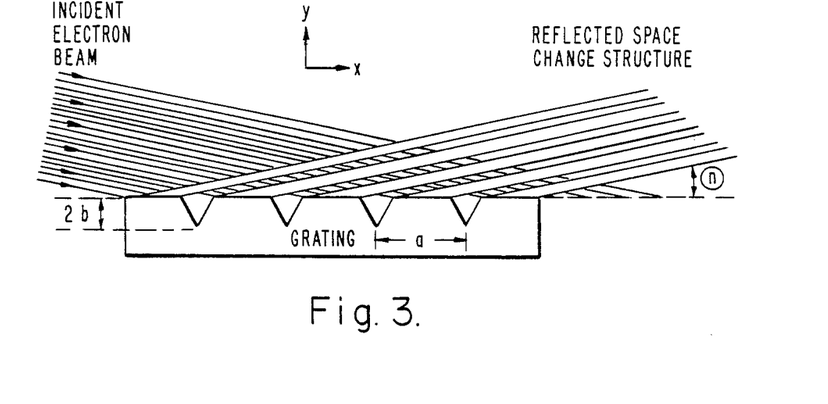
FIG. 3 illustrates a simple model of the structure for generating Salisbury-type radiation.

To describe the characteristics of this "Salisbury" radiation, a simple model is considered in which electrons scatter off the surface at an angle $\theta$, creating potential troughs through which the unscattered electrons then move. This is illustrated in FIG. 3.

For a grating of spatial period a, the troughs will have a period a in the x-direction and a period $a/\tan\theta$ in the y-direction, where coordinates axes have chosen so that x lies parallel to the grating along the direction of the unscattered electron velocity, and the y-direction is perpendicular to this grating, and the y-direction is perpendicular to this grating. The basic features of the radiation to determine in this model can be calculated from a crude approximation by which the electrostatic potential $\phi_G$ of the troughs is given by only the lowest term in its harmonic expansion:

$$\phi_G = \phi_1 \exp[ik_{Gx}x + ik_{Gy}y] \qquad (9)$$

where $$k_{Gx} = 2\pi/a, \quad k_{Gy} = 2\pi/a \tan\theta \qquad (10)$$

Electrons moving through this potential will radiate, with the energy $d\epsilon_\omega$ radiated into the element of solid angle $d\Omega$ in the k-direction, in the form of waves with frequencies in the angular frequency interval $d\omega$. The incoherent portion $d\epsilon_{inc}$ of the radiation arises from the uncorrelated motion of the electrons. By similar analysis which led to Equation 7, it can be shown that:

$$\frac{d\epsilon_{inc}}{d\Omega\, d\omega} = \frac{Ne^x\phi_1{}^2 k_{Gx} T}{\pi c^3 m} S(\theta)\, \delta\left(\omega + \frac{k_{Gx}v_o}{1 - \frac{v_o}{c}\cos\theta}\right) \qquad (11)$$

with $$S(\theta) = \frac{S(\theta)}{1 - \frac{v_o}{c}\cos\theta} = \qquad (12)$$

$$\frac{1}{\left(1 - \frac{v_o}{c}\cos\theta\right)^5}\left[\sin\theta - \frac{k_{Gy}}{k_{Gy}}\left(\cos\theta - \frac{v_o}{c}\right)\right]^2$$

For $k_{Gy}=0$, $S(\theta)$ is peaked in the forward quadrant at:

$$\theta = \cos^{-1}\left[\frac{c}{Gv_o}\left(-2 \pm \left(4 + 60\left(\frac{v_o}{c}\right)^2\right)^{\frac{1}{2}}\right)\right] \qquad (13)$$

At the other extreme, when $k_{Gx}=0$, $S(\theta)$ is peaked at:

$$\theta = \cos^{-1}\left[\frac{5}{3}\left(\frac{v_o}{c}\right) - \frac{2}{3}\left(\frac{c}{v_o}\right)\right] \qquad (14)$$

and has a zero at:

$$\theta = \cos^{-1}\left(\frac{v_o}{c}\right) \qquad (15)$$

3. Spontaneous Radiation Conclusions.

The spontaneous radiation due to surface currents is much greater in intensity than the spontaneous radiation arising from acceleration of the electrons in the potential troughs created by the scattered electrons. This is because the amplitude of the perturbations in the surface currents due to the grating is much larger than the perturbations in the electron trajectory due to the potential troughs. The former is of the order of b, the grating amplitude (equal to one-half the grating depth), while the latter is of the order of $e\delta_\psi/mv_{o\omega}$ where $\delta_\psi$ is the potential due to the troughs, m is the electron mass, and $\omega$ is of the order of $k_g v_o$. From Poisson's equation, $\delta_\psi \sim k_g{}^{-2} m_s e$ where $m_s$ is the density of scattered electrons. Thus, since the spontaneous radiation intensity is proportional to the square of the perturbation amplitude, the ratio of the surface current radiation to the trough radiation is of the order of magnitude given in Equation 16.

$$\frac{\text{Surface current radiation}}{\text{Trough Radiation}} = 0\left[\left(\frac{bk_g{}^3 mv_o{}^2}{m_s e_2}\right)^2\right] \qquad (16)$$

For typical parameters in Salisbury's early experiments, $b=10^{-14}$ cm, $k_g=10^4$ cm$^{-1}$, $mv_o{}^2=2\times 10^{-7}$ ergs, $n_s=10^8$ cm$^{-3}$, this ratio is $0(10^{24})$. Accordingly, if the periodic space-charge structure due to the scattered electrons is to have any effect on the total spontaneous radiation, it must be through amplification of the spontaneous radiation from the induced surface currents.

B. Coherent (Stimulated) Radiation

1. Amplification of Radiation Moving Through the Periodic Space Charge Structure Formed by Electrons Reflecting from Grating In order for an electron beam to amplify an electromagnetic wave, the electrons must interact resonantly with the wave, i.e., the wave must have a component with a phase velocity whose projection in the direction of the electron motion is equal to or less than the electron velocity. The periodic space charge created by the electrons reflecting from the grating makes possible this situation. Thus, an electromagnetic wave which in the absence of this periodic space-charge structure would have the dependence $\vec{E} = (\vec{E}_{kx}\vec{i}_x + E_{ky}i_y)\, e^{i(\omega t - \vec{k}\cdot\vec{r})}$ will in the presence of the periodic structure have the form $$e^{i\omega t} \sum_{n=-\infty}^{n=\infty} e^{-i(\vec{k}+nk_g)\cdot\vec{r}} a_n.$$

The magnitude of the spatial sideband amplitudes $|a_n|$ is determined by solving Maxwell's equations with the equations of motion for the electrons.

The phase velocity of the nth sideband is $\omega/|k+nk_g|$ and can be equal to or even less than an electron velocity. This permits resonant transfer of energy from the electrons to the waves, resulting in considerable amplification of the radiation. As an example, it is assumed that the unperturbed electron distribution is described by the distribution function:

$$f_o = n_o\left(\frac{m}{2\pi kT}\right)^{y_2}\frac{\alpha_1}{\pi}\exp\left[-\frac{m}{2kT}(v_x - v_o)^2 - \right. \qquad (17)$$

$$\alpha_1(v_y{}^2 + v_z{}^2) + \frac{\epsilon}{2}(1 + \cos(k_{gx}x +$$

$$K_{gy}y))n_o\left(\frac{m}{2\pi kT}\right)^{\frac{1}{2}}\frac{\alpha_1}{\pi}\exp\left[-\frac{m}{2kT}(v_x - v_o)^2 - \right.$$

$$\left. x_1(v_y{}^2 + v_z{}^2)\right]$$

This describes a group of electrons of temperature T and average density $n_o$ drifting with velocity $v_o$ in the y-direction. Boltzmann's constant is indicated by k, and the presence of electrons scattered from the periodic grating surface is described by the $\xi \cos(k_{Gx}x + k_{Gy}y)$ term.

Solution of Maxwell's equation with the equations of motion leads to the result that the energy transferred per second from the electrons in a unit volume to the radiation field is $|A+B+C+D=$, where:

$$A = \frac{z1}{k_x^+}[E_{kx}^+]^2(v_o + \delta v)\exp\left[-\frac{m}{2kt}(\delta v)^2\right] + \tag{18}$$

$$\frac{z2}{2}\left[\frac{1}{(k_x^+)^2}(k_x^+E_{ky}^+ - k_y^+E_{kx}^+)E_{ky}^+ - \frac{1}{(k_x^+)^3}(k_x^+E_{ky} - k_y^+ \right.$$

$$E_{kx}r)^2 + \frac{k_y^+}{4(k_x^+)^2}E_{ky}^+E_{kx}^+ - \frac{k_y^+}{2(k_x^r)^3}(k_x^+E_{ky}^+ -$$

$$\left. k_y^+E_{kx}^+)E_{kx}^+\right]\exp\left[-\frac{m}{2kT}(\delta v)^2\right]$$

$$B =$$

$$\frac{z2}{k_x^+}\left[E_{ky}r - \frac{1}{k_x^r}(k_x^+E_{kx}^+ - k_y^+E_{ky}^+)^2\right]\exp\left[-\frac{m}{2kT}(\delta v)^2\right]$$

$$C = \frac{z3}{k_x^+}[E_{kx}E_{kx}^+(v_o + \delta v)\delta v]\exp\left[-\frac{m}{2kT}(\delta v)^2\right] +$$

$$\frac{z2}{4}\left[\frac{1}{(k_x^+)^2}(k_x^+E_{ky}^+ - k_y^+E_{kx}^+)E_{ky} - \frac{1}{(k_x^+)^3}(k_x^+E_{ky}^+ - \right.$$

$$k_y^+E_{kx}^+)\text{ times }(k_xE_{kx} - k_y^+E_{kx}) + \frac{k_y^+}{4(k_x^r)^2}E_{ky}K_{kx}^+ -$$

$$\frac{k_y^+}{2(k_x^r)^3}(k_xE_{ky} - k_yE_{kx})E_{kx}^+ \text{ times } \exp\left[-\frac{m}{2kT}(\delta v)^2\right]$$

$$D = \frac{z2}{4k_x^+}\left[\left(E_{ky}^+ - \frac{1}{k_x^r}(k_x^+E_{ky}^+ - k_yE_{kx}^+)\right)\left(E_{ky} - \right.\right.$$

$$\left.\left.\frac{1}{k_x^r}(k_xE_{ky} - k_yE_{kx})\right)\right]\text{ times }\exp\left[-\frac{m}{2kT}(\delta v)^2\right]$$

$$z1 = \frac{e^2}{kT}\left(1 + \frac{\xi}{2}\right)n_o\sqrt{\frac{m}{2\pi kT}}$$

$$z2 = \frac{e^2}{m}n_o\left(1 + \frac{\xi}{2}\right)\sqrt{\frac{m}{2\pi kT}}$$

$$z3 = \frac{e^2}{kT}\frac{\xi}{4}n_o\sqrt{\frac{m}{2\pi kT}} \text{ and}$$

$$k_x^+ = k_x + k_{gx}, \quad k_y^+ = (k_y + k_{gy}).$$

In the above it has been assumed that $\omega = (k_x + k_{gx})v_o + \delta v(k_x + k_{Gx})$ where $\delta v$ is some fraction $O(1)$ of the thermal velocity. The above dispersion condition plus the radiation condition $\omega = kc$ implies that:

$$k = \frac{2\pi}{a[\beta^{-1} - \cos\theta]},$$

where a is the grating spacing, and:

$$\beta = \frac{v_o + \delta v}{c} \tag{19}$$

Figure 4A:
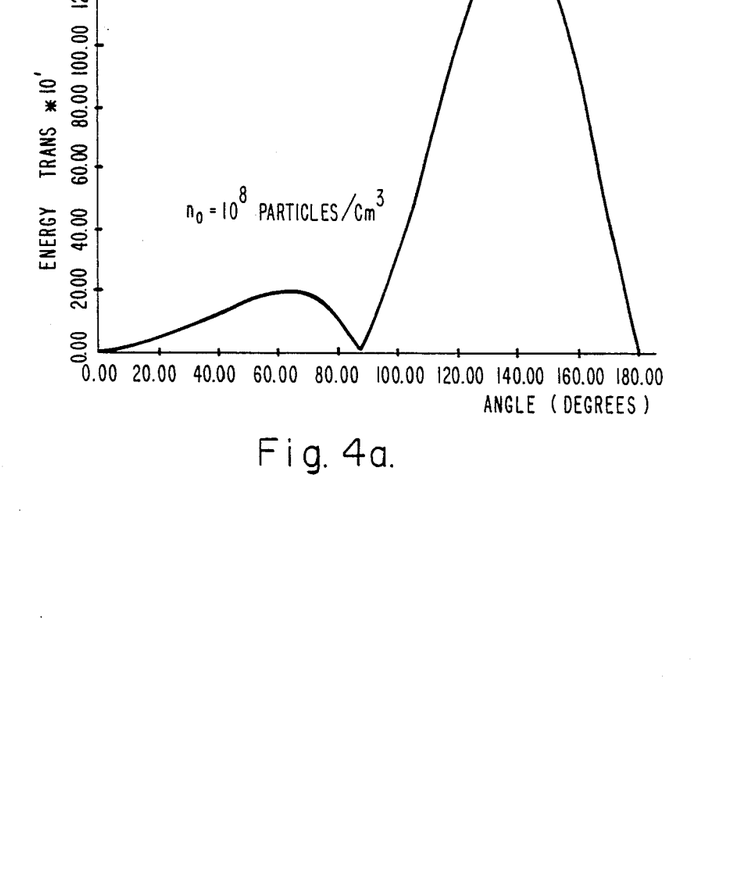
FIGS. 4a–4c are graphs plotting the energy transfer from electrons to the radiation field in accordance with the invention for representative parameters.
Figure 4B:
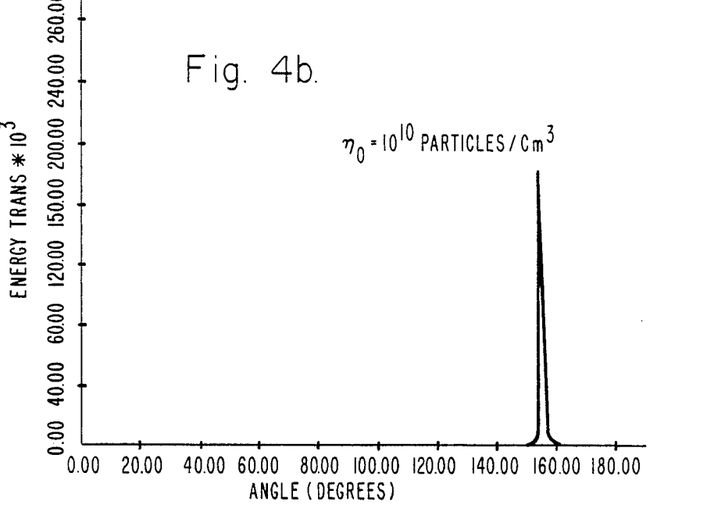
Figure 4C:
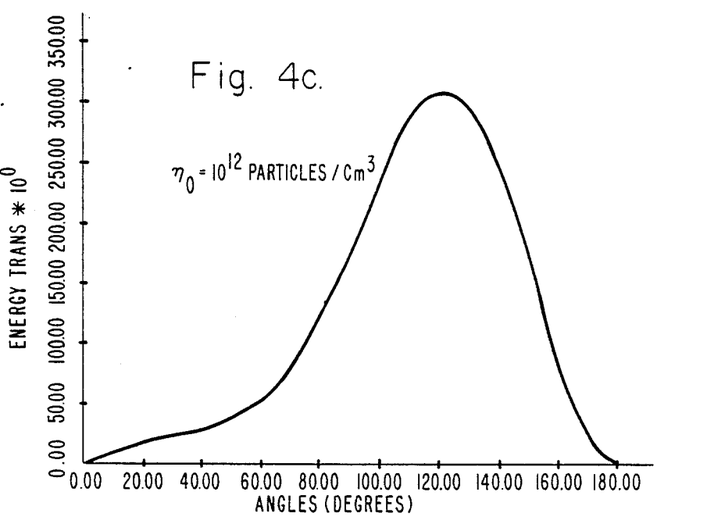

FIGS. 4a, 4b, 4c show normalized plots of energy transfer from electrons to the radiation field for representative parameters and for different values of electron density, $n_o$. In the figures, the following list of parameters is used, with:

$a = 10^{-4}$ cm
$k_{Gx} = 2$ f/a
$k_{Gy} = -10$ $k_{Gx}$
$v_o = 2 \times 10^{10}$ cm/sec
$T = 100°$ k.

$n_o = 10^8$ particles/cm$^3$ (FIG. 4a)

$\quad = 10^{10}$ particles/cm$^3$ (FIG. 4b)

$\quad = 10^{12}$ particles/cm$^3$ (FIG. 4c)

It is therefore apparent from the foregoing that coherent radiation can be obtained even in the absence of a cavity when electrons are reflected from a grating. The condition for the coherent radiation to dominate the incoherent radiation is that the spontaneous radiation from the induced surface currents must experience an (inverse Landau damping) amplification gain greater than unity on moving through the periodic space-charge structure above the grating. An amplification gain greater than unity occurs when the total average energy transfer from the electrons to the radiation field is greater than the energy radiated by the induced surface currents (given in Equation 7). The gain G is equal to the ratio $I/I_{input}$, where:

$I = \int dv^3[A+B+C+D]/r.$ $I_{input}$ is given by Equation 7 and is the radiation intensity from the induced surface currents.

The amplification gain greater than unity occurs for reasonable parameter values when the electron beam is thick enough, dense enough, and well collimated enough to give a well defined periodic space-charge structure on reflection. By way of example only, the following are presently considered reasonable parameter values: 0.1 to 1 milliradian beam divergence, beam densities on the order of $10^8$ particles/cm$^2$, particle energies on the order of 100 kV, and grating spacings on the order of 10,000 Angstroms. These values are exemplary only; other values are also reasonable and attainable.

If the space-charge structure is not well-defined, there would not be an effective mechanism to impart energy from the electron beam to the radiation generated by the grating surface currents.

2. Coherent Radiation from Collective Effects for an Electron Beam Moving Through the Periodic Space-charge Structure Formed by Electrons Reflecting from Grating Coherent radiation can also arise from the correlated motion of the electrons. Equation 20 gives the radiation vector potential as an integral over $\vec{j}_\Omega$, the $\omega$-frequency fourier component of the current density.

$$A_\omega = \frac{e^{ikR_o}}{cR_o}\int \vec{j}_\omega e^{-i\vec{k}\cdot\vec{r}}d^3\vec{r} \tag{20}$$

Equation 20 shows that if $\vec{j_\omega}$ has a spatial variation of the form $e^{i\vec{k}\cdot\vec{r}}$ with $\vec{k}=\omega/c$, then the integrand does not have a spatial oscillation and, therefore, does not tend to be self-cancelling on integration. Accordingly, a current density with this form of spatial variation can make a very large contribution to the radiation field.

To determine if electrons moving through the potential troughs can give rise to a large microscopic current variation of the form $e^{i\vec{k}\cdot\vec{r}}$, the Vlasov equation for an electron distribution function $f(\vec{r}, \vec{v}, t)$ can be considered. Here $f(\vec{r}, \vec{v}, t)$ denotes the number of electrons in spatial volume dr at position r and the velocity interval $d^3v$ at velocity v, and satisfies the equation:

$$\frac{\delta f}{\delta t} + \vec{v}\cdot\Delta f - \frac{e}{m_0}\Delta\psi\cdot\Delta_v f = 0 \quad (21)$$

From the solution of Equation 21 along with Poisson's equation for the electrostatic potential $\psi$:

$$\Delta^2\psi = 4\pi ne \quad (22)$$

it may be demonstrated that electrons moving through the stationary potential troughs $\Phi_G$ of Equation 9 can give rise to spatial variations in the current density $j_\omega(r)$ of the form $e^{i\vec{k}\cdot\vec{r}}$, $|\vec{k}|=\omega/c$. This occurs when these equations are solved through second order in $\Phi_G$.

Solution of these equations give current densities which have spatial and time variations of the form:
  (a) $e^{-i(\omega_s t - k_{sx}x - k_{sy}y)}$
  (b) $e^{i(k_{Gx}x + k_{Gy}y)}$
  (c) $e^{-1(\omega_s t - (k_{sx}\pm k_{Gx})x - (k_{sy}\pm k_{Gy})y)}$ Thus, $j_\omega$ varies as $e^{-i(\omega t - \vec{k}\cdot\vec{r})}$ when:

$$\omega = \omega_s \quad (23a)$$

$$k_x = k_{sx} \pm k_{Gx} \quad (23b)$$

$$k_y = k_{sy} \pm k_{Gy} \quad (23c)$$

this component will give rise to coherent radiation.

To determine what frequencies $\omega_s$ are likely to be excited in the beam of interaction with the troughs, the equation for the density of the beam in the frame x moving with the beam is considered.

$$\frac{\partial^2 n}{\partial t^2} + \omega_p^2 n = -\omega_p^2 n_a \quad (24)$$

In this equation, $n_a$ denotes the density of the electrons comprising the troughs through which the unscattered electrons of density n move. To determine what frequencies are likely to be excited, the Green's function solution for $n=\delta(x+v_0 t)$ is considered, i.e., for a delta-function trough which is fixed in the frame of the grating. The solution to Equation 24 for this $n_a$ is:

$$n(x,t) = -\omega_p \sin\left[\frac{\omega_p}{v_0}(x + v_0 t)\right] \quad (25)$$

Thus, the frequency excited is $\omega_p$. A sum over many $\delta$ functions for $n_a$ gives the same frequency of excitation.

As a result, it is apparent that collective effects can be used to enhance the intensity of coherent radiation from an electron beam scattering off a diffraction grating. This will occur when the plasma frequency $\omega_p$ of the beam is comparable to the radiation frequency. The latter is of the order of $v_0/a$, where $v_o$ is the electron velocity and a is the grating spacing. This is presently a practical condition for mm-wave frequencies.

C. Additional Embodiments

1. Other Techniques for Creating the Space-charge Structure

Figure 5A:
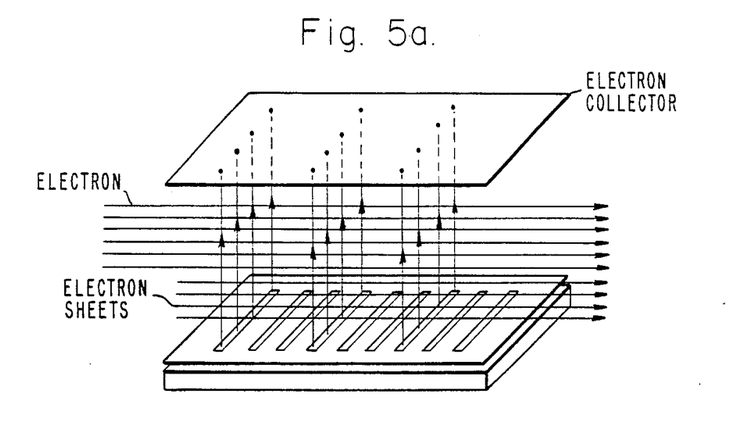
FIGS. 5a and 5b show simplified diagrams of an alternate embodiment of the invention, wherein the periodic space-charge structure is created by an accelerating grid structure oriented so as to inject sheets of electrons transverse to the radiating electron beam.
Figure 5B:
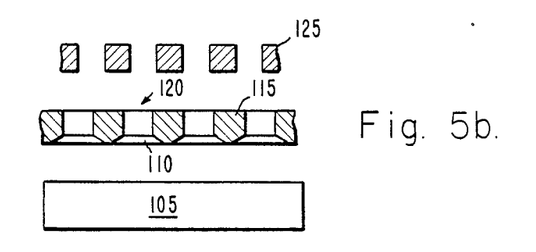

From the foregoing, additional ways may be seen to improve the performance of a radiation source based on the interaction of electrons with a conductive grating. Since the periodic space-charge structure above the grating has been seen to play an important role in giving high intensity radiation, other means of creating this structure can be considered besides scattering electrons from the grating. One way, for instance, to have an accelerating grid structure oriented so as to inject sheets of electrons transverse to the radiating electron beam. This is illustrated in FIG. 5a. Accordingly, the periodic space-charge structure may be created by means other than scattering an electron beam from a grating, e.g., by using a periodic Pierce electrode structure to create sheets of charged particles transverse to beam as well as to create induced surface current. Periodic Pierce electrode structures are well known, e.g., "ICF Neutralized Light Ion Beam Studies with Ballistic Focusing, Time Compression and Low Temperature Source", D. B. Chang and W. Salisbury, 1980 *IEEE International Conference on Plasma Science*, May 19-21, 1980. In this embodiment, for example, a periodic Pierce electron gun may be employed which comprises an electron emitter, a low voltage, space-charge limited, extraction and acceleration gap, and a high voltage, source limited acceleration and focusing gap. This structure is illustrated in FIG. 5b, where the extraction and acceleration gap 110 is between the electron emitter 105 and extraction grid 115. The high voltage acceleration and focusing gap 120 is disposed between the extraction grid and the acceleration grid 125. The beam is perferably uniform in one dimension with a 1 mm periodic Pierce electron gun structure is analogous to the structure of periodic ion injectors designed for inertial confinement fusion applications.

2. Cavity Devices

Figure 6:
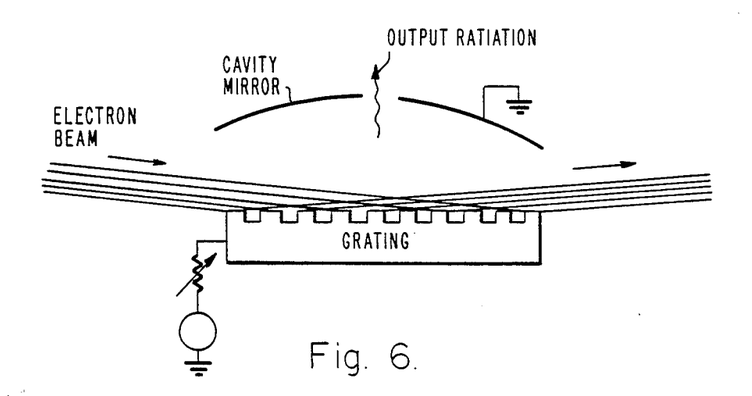
FIG. 6 is a diagram of a radiation source employing a cavity in accordance with the invention.

Another way to increase the radiation intensity is to place the beam-grating structure inside a cavity. An exemplary structure is shown in FIG. 6. An essential difference between this resulting cavity device and existing cavity devices such as the above-noted Orotron and Ledatron devices is that the periodic space-charge structure extending far above the grating would allow electrons distant from the grating to interact resonantly with the cavity field instead of just those electrons within a grating spacing of the grating. This results from the fact that, in these known devices, the electron beam does not impinge on the grating. With this technique, it is expected that higher electron densities and more clearly defined sheets of electrons with more sharply defined boundaries will be obtained. The electron sheets need not be perpendicular to the electrode structure.

Figure 7:
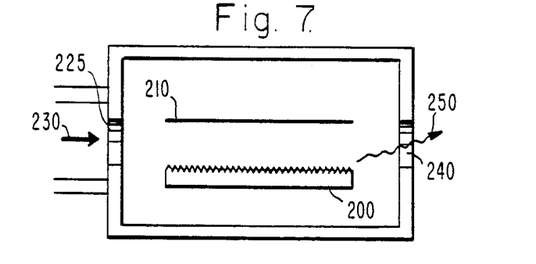
FIG. 7 is a simplified schematic drawing of a radiation source employing a cavity with a superconducting reflecting surface to increase the intensity of the emitted radiation.

For these cavity devices several ways of increasing the intensity are apparent. An illustrative embodiment of a radiation source employing a superconducting cavity is shown in FIG. 7. The grating 200 and cavity 210 are disposed within evacuated helium dewar 220 to reduce the temperature of the cavity 210 to below 20° k. The cavity 210 is fabricated from a superconductor material, such as $Nb_3Sn$; alternatively, a thin film of superconductive material may be formed on the grating side of a substrate. The electron beam generator (not shown) need not be disposed within dewar 220, but rather may be disposed to communicate the electron beam 230 through an opening 225 so as to impinge on the grating at a glancing angle. The resulting radiation 250 may be emitted from the dewar through window port 240.

The superconductive material has a near total loss of resistance at a critical temperature that is characteristic of each material. Thus, as the cavity material is cooled below its critical temperature, the cavity mirror becomes less lossy, enhancing the intensity of the emitted radiation.

With the Q of the cavity much larger than that of present devices, this will permit the resonant fields to increase so that more energy can be transferred between the beam electrons and the field.

Figure 8:
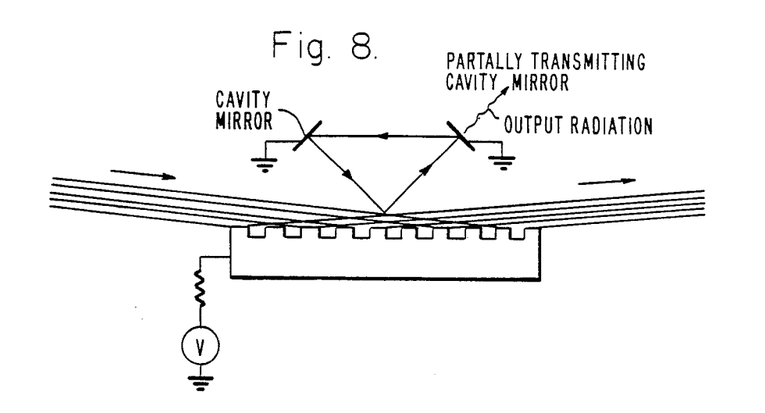
FIG. 8 is a diagram of a radiation source mounted in a cavity with reflecting faces adapted to capture radiation at predetermined angles.

The cavity may also be constructed so that the reflecting faces capture the radiation at those angles for which maximum intensity occurs. This may require a cavity with three reflectors (including the grating), for instance, rather than two. An illustrative structure is shown in FIG. 8.

Figure 9:
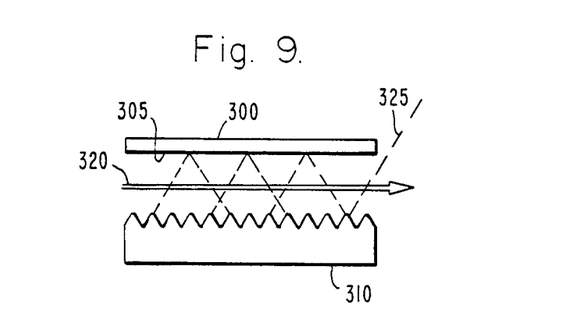
FIG. 9 is a simplified schematic view of a radiation source employing a planar mirror.

Referring now to FIG. 9, a radiation source employing a planar mirror is illustrated. In this embodiment a planar mirror 300 is supported above the grating 310, with the mirror surface 305 facing the grating. The electron beam 320 is passed between the grating and mirror surface. The mirror may be placed very close to the grating so that the generated radiation 325 can be amplified in the slow wave space-charge sheets through a great number of bounces between the mirror and the grating.

3. Grating Blaze Angle

Another way to increase the intensity is to orient the blaze angle of the grating so as to enhance either a cavity mode or the radiation in the direction of maximum intensity. It may also be of advantage to make the grating depth equal to a quarter wavelength in order to force the radiation intensity to be larger in directions away from the grating.

Figure 10A:
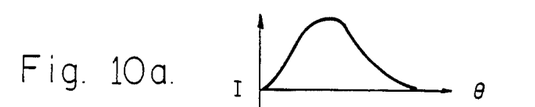
FIGS. 10a–10d are graphs illustrating respectively the relationship between the observation angle and the amplitude of induced surface current radiation, the gain resulting from the space-charge structure and the product function of the amplitude and amplification functions, for a radiation source in accordance with the invention.
Figure 10B:
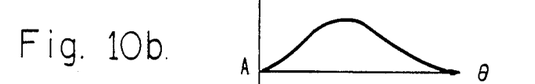
Figure 10C:
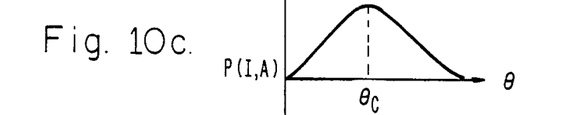

To determine the direction of the maximum intensity, the magnitude of emitted radiation from induced surface currents must be considered as well as the radiation amplification in the space-charge sheets. The former factor is calculated by Equation 7; the latter factor results from the solution of Equation 25. FIGS. 10(a)-(c) illustrate graphically the determination of the angle at which maximum intensity occurs. FIG. 10(a) represents the amplitude of the radiation emitted as a result of induced surface currents as a function of the viewing angle $\theta$ (Equation 7). FIG. 10(b) depicts the amplification of radiation passing through the space-charge structure, as a function of the viewing angle $\theta$ and for a particular angular orientation of the space-charge structure in relation to the grating (Equation 25). FIG. 10(c) represents the produce of the emission amplitude (10(a)) and amplification factor (8(b)). The resulting product curve then has an amplitude peak at a particular observation angle $\theta_c$.

Figure 10D:
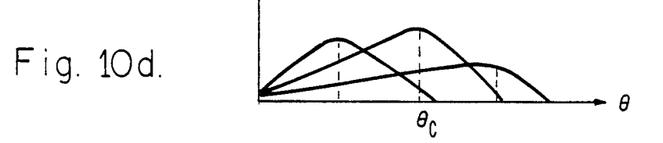

Because the magnitude of the amplification through the space-charge sheets is dependent on their angular relationship to the grating, the amplification should be varied as a function of this angle, and the product of the amplification and emission amplitude recalculated to optimize the peak. This is illustrated by the three curves shown in FIG. 10(d), each representing the product resulting from a particular angular orientation of the space-charge sheets.

Once the angular orientation of the space-charge sheets and the observation angle has been determined for which the maximum intensity is obtained, then the grating blaze angle may be selected so as to result in the space-charge sheets being directed in the angle for which the maximum intensity is obtained.

4. Multi-frequency Radiation Source

The radiation source described above provides a means of simultaneously giving radiation at several different wavelengths, with the interesting feature that there would be a definite correlation between the phases of the radiation at different wavelengths. This can be done by using several beams of electrons of 32fferent energies, since the wavelength emitted by any electron depends on its velocity according to Equation 1. Alternatively, a wide electron beam may be employed which impacts on two or more gratings of different grating spacing widths, exploiting variation of another parameter of Equation 1. Yet another technique is to employ two or more gratings of the same grating spacing but with one or more oriented obliquely with respect to the beam direction so that the effective grating spacing is narrowed.

5. Modulation

The radiation from the radiation source can also be modulated, both in frequency and in amplitude. The former can be achieved easily by varying the acceleration voltage for the electron beam. The latter can be obtained by deflecting the beam transversely, so that the number of electrons impacting the grating may be varied. Transverse deflection can be achieved by applying a small voltage to the grating itself.

6. X-ray Radiation Source

Figure 11A:
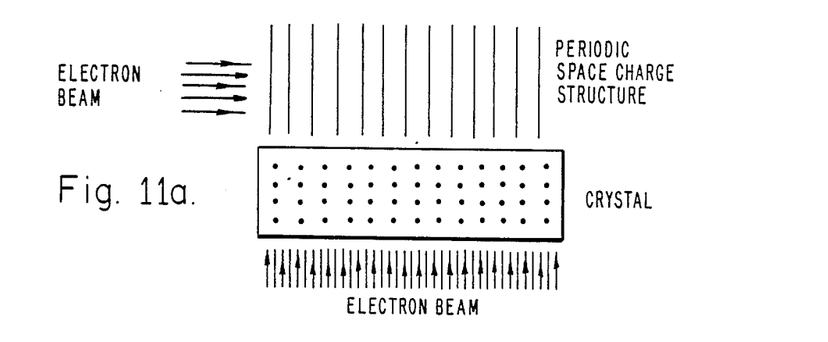
FIGS. 11a and 11b are simplified diagrams of features of a radiation source in accordance with the invention, wherein a crystalline and superlattice structure are respectively employed as the grating.
Figure 11B:
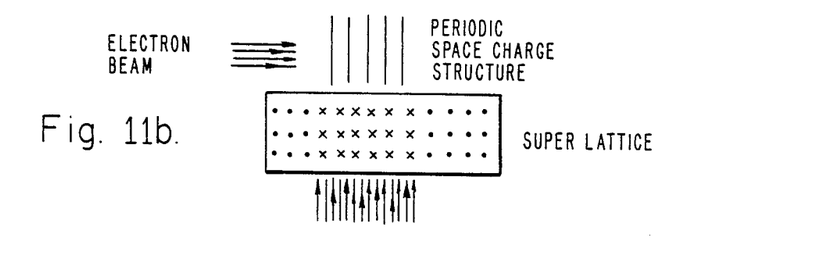

It is of interest to consider the extension of this technique to x-ray wavelengths, e.g., to construct a compact x-ray laser. This requires a grating with a small spatial period. Crystals (e.g., Cu, Ni, Si) can be used for this purpose for spatial periods which are on the order of Angstroms. Superlattices can be used for 0(10–100 Å) periods. Exemplary structures are shown in FIGS. 11(a) and 11(b), respectively, employing the crystalline and superlattice structure. As is shown, the superlattice structure is a semiconductor doped with impurities (indicated by "x" in FIG. 11(b)). The periodic space-charge structure can be obtained either by Bragg reflecting electrons from these lattices, or transmitting charged particles through the lattices to created sheets of space-charge. Channeling would help define the sheets in the latter case. For the reflection mode of operation, the beam would have to be very well collimated in order that the space-charge periodicity would extend an appreciable distance from the grating. The surfaces of the crystal or semiconductor need to be conductive so as to set up the surface currents which create the radiation. The conductivity needs to be high enough to drain the charge from the grating to prevent the surface charge from repelling the electron beam. In the case of the semiconductor, its conductivity may be sufficient for this purpose.

7. Broadband Radiation Source

The above embodiments have contemplated that the electron beam would strike the grating at a grazing angle, to optimize the number of electrons which are reflected from the grating so as to set up the periodic space-charge structure. It has been found that if the electron beam strikes the grating at angles larger than grazing angles so that a significant number of electrons are trapped in the grating rather than being reflected, significant broadband noncoherent radiation is generated. Electrons which are trapped within the grating material are decelerated, and this change in velocity gives rise to Bremsstrahling radiation, a well-known phenomenon. This radiation is broadband and noncoherent. In fact, this type of radiation can be generated by impacting the electron beam onto a polished surface. This property can be exploited to provide an added capability to the radiation source of the present invention. Thus, in FIG. 1, the grating may simply be tilted to a significant angle with respect to the incident beam. Significant broadband radiation will be produced as a result.

It is understood that the above-described embodiments are merely illustrative of the many possible specific embodiments which can represent principles of the present invention. Numerous and varied other arrangements can readily be devised in accordance with these principles by those skilled in the art without departing from the spirit and scope of the invention.

What is claimed is:

1. A radiation source for generating coherent radiation, comprising:
    an electrically conductive grating;
    an electron beam means for directing a beam of electrons above the grating so as to generate spontaneous radiaton from the interaction of the electron beam and the conductive grating;
    means for providing a periodic space-charge structure of electrons above said grating such that the spontaneous radiation passes through said space-charge structure; and
    wherein said space-charge structure further comprises means for amplifying said spontaneous radiation on passing through said space-charge structure by a factor greater than unity.

2. The radiation source of claim 1 wherein said space charge structure means provides a well-defined periodic space charge structure.

3. The improvement of claim 2 wherein said space-charge structure means comprises means for causing said electron beam to collide with said grating at a grazing angle, whereby electrons scattered from said grating structure comprise said periodic space-charge structure.

4. The radiation source of claim 3 wherein said electron beam means provides a dense, collimated beam.

5. The radiation source of claim 4 wherein said electron beam means provides a beam density of at least $10^8$ particles/cm$^2$, with a beam divergence in the range of 0.1 to 1 milliradians.

6. The radiation source of claim 1 wherein said means for providing a periodic space-charge structure comprises means for passing sheets of charged particles through said grating in a transverse relationship with said electron beam.

7. The radiation source of claim 6 wherein the means for passing sheets of charged particles through the grating comprises a periodic Pierce electrode structure.

8. The radiation source of claim 1 further comprising means for modulating the amplitude of the radiation.

9. The radiation source of claim 8 wherein the modulating means comprises means for impressing a deflection voltage on the grating.

10. The radiation source of claim 1 further comprising means for modulating the frequency of the radiation from the source.

11. The radiation source of claim 10 wherein said means for modulating the frequency of the radiation comprises means for varying the velocity of the electrons comprising the electron beam.

12. The radiation source of claim 11 wherein the electron beam means comprises an acceleration voltage means for varying the electron velocity by modulating the acceleration voltage on the electrons.

13. A source of coherent radiation, comprising:
    an electrically conductive grating having a grating spacing a;
    means for providing a periodic space charge structure of electrons above said grating;
    electron beam means for directing a beam of electrons through said periodic space charge structure, said electron beam having a natural plasma frequency comparable to the radiation frequency.

14. The invention of claim 13 wherein said radiation frequency is of the order of $v_o/a$, where $v_o$ is the electron velocity of the electron beam and a represents the grating spacing.

15. The invention of claim 13 wherein said electron beam collides with said grating at a grazing angle, whereby electrons scattered from said grating structure comprise said period space charge structure.

16. A radiation source, comprising:
    an electrically conductive cavity;
    an electrically conductive grating means disposed within the cavity;
    means for providing a periodic space charge structure of electrons above the grating; and
    electron beam means for directing a beam of electrons through said periodic space charge structure.

17. The radiation source of claim 16 wherein the cavity is defined by a cavity wall fabricated from a superconducting material, and the radiation source further comprises cooling means for cooling the cavity, whereby the Q of the cavity is increased to allow increased energy transfer between the beam electrons and the field.

18. The radiation source of claim 16 wherein the cavity comprises reflecting faces arranged to capture the radiation at preselected orientations.

19. The radiation source of claim 18 wherein the preselected orientations are those which provide maximum radiation intensity.

20. The radiation source of claim 18 wherein said predetermined direction is dependent upon the magnitude of emission resulting from induced surface currents on said grating and the orientation of the space-charge structure in relation to the grating.

21. The radiation source of claim 16 wherein said cavity comprises a planar mirror surface disposed above said grating surface, and the electron beam is passed between the grating and the mirror surface, whereby the spontaneous radiation is repetitively reflected off the mirror surface back through the space-charge structure.

22. In a radiation source employing an electrically conductive grating and electron beam means for directing a beam of electrons above the grating so as to generate spontaneous radiation from the interaction of the electron beam and the conductive grating, the improvement wherein:

the electrically conductive grating comprises a crystal having a reflective surface, wherein the spatial spacing of the grating is on the order of Angstroms, and the spontaneous radiation comprises x-ray wavelength radiation.

23. The invention of claim 22 wherein said electron beam collides with the reflective surface of the crystal at a grazing angle, whereby electrons scattered from said surface comprise a periodic space charge structure above the crystsal surface.

24. The invention of claim 22 further comprising a means for passing charged particles through the crystal so as to create periodic sheets of charged particles above said reflective surface.

25. The invention of claim 22 wherein said crystal material comprises one of the group of Cu, Ni or Si.

26. In a radiation source employing an electrically conductive grating and electron beam means for directing a beam of electrons above the grating so as to generate spontaneous radiation from the interaction of the electron beam and the conductive grating, the improvement wherein:
the conductive grating comprises a superlattice structure comprising a reflective surface, wherein the spatial spacing of the grating is on the order of ten to one hundred Angstroms, and the spontaneous radiation comprises x-ray wavelength radiation.

27. The invention of claim 26 wherein said electron beam collides with the reflective surface of the superlattice at a grazing angle, whereby electrons scattered from said surface comprise a periodic space charge structure above for reflective surface.

28. The invention of claim 26 further comprising a means for passing charged particles through the superlattice structure so as to create periodic sheets of charged particles above said reflective surface.

29. A radiation source, comprising:
electrically conductive grating whose elements are characterized by a predetermined blaze angle and a grating space a;
electron beam means for directing a beam of electrons above said grating so that said electron beam collides with said grating at a grazing angle, whereby electrons reflected from the grating comprise a periodic space charge structure of aligned sheets of electrons above the grating; and
wherein the grating blaze angle is selected to orient said sheets in a predetermined direction for which the maximum intensity of radiation is obtained.

30. A tunable radiation source adapted to selectively generate broadband incoherent radiation and coherent radiation over a broad frequency range, comprising:
an electrically conductive grating;
an electron beam generator for generating a high energy electron beam;
means for directing the electron beam over said grating so as to collide with said grating, said means comprising selection means for selectively determining the angle at which said electron beam collides with said grating;
means for selectively providing a well-defined space charge structure of electrons above said grating when said directing means causes the electron beam to collide with the grating at a grazing angle;
whereby coherent spontaneous radiation is generated when the beam collides with the grating at a grazing angle, and Bremsstrahling radiation is generated when the collision angle is direct enough that a substantial number of the electrons are absorbed into the grating.

31. A radiation source, comprising:
an electrically conductive grating having a grating element spacing;
means for providing a periodic space charge structure of electrons above said grating;
electron beam means for directing a plurality of beams of electrons of different electron energies through said periodic space charge structure, whereby spontaneous radiation of different wavelengths is generated from the interaction of the electron beams and the grating means, and whereby the wavelengths of the radiation are dependent on the electron energies and the grating spacing.

32. The radiation source of claim 31 wherein said means for providing a periodic space-charge structure above said grating is adapted such that the spontaneous radiation experiences an amplification gain greater than unity on passing through the periodic space-charge structure above the grating, whereby coherent spontaneous radiation is generated.

33. The radiation source of claim 31 wherein said means for providing a space-charge structure comprises means for causing at least one of said electron beams to collide with said grating at a grazing angle, whereby electrons scattered from said grating means comprise said space-charge structure.

34. A radiation source, comprising:
an electrically conductive grating comprising a plurality of grating elements having a first effective grating spacing in a first region and a second effective grating element spacing in a second region;
means for providing a periodic space charge structure of electrons above said grating means;
electron beam means for directing a beam of electrons through said periodic space charge structure, whereby spontaneous radiation of two different wavelengths is generated from the interaction of the electron beam and the two regions of the grating means, and whereby the radiation wavelengths are dependent on the electron energy and the grating element spacings.

35. The radiation source of claim 34 wherein said the spontaneous radiation experiences an amplification gain greater than unity on passing through the periodic space charge structure above the grating, whereby coherent spontaneous radiation is generated.

36. The radiation source of claim 34 wherein said means for providing a space-charge structure comprises means for causing said electron beam to collide with said grating means at a grazing angle, whereby electrons scattered from said grating means comprises said periodic space-charge structure.

37. The radiation source of claim 34 wherein said spatial spacing of the gratings in the first grating region are substantially the same as the spatial grating spacings in the second record, and wherein the grating elements in the first region and the second region are disposed so that the angular disposition of the electron beam with respect to the gratings in the first region differs from the angular disposition of the electron beam with respect to the gratings in the second region, whereby the effective grating spacings in the first region differ from the effective grating spacing in the second region in the direction of the beam.

* * * * *